US012771512B2

(12) United States Patent
Fu

(10) Patent No.: US 12,771,512 B2
(45) Date of Patent: Oct. 20, 2026

(54) METHOD FOR DETERMINING TRANSMISSION PARAMETER, METHOD FOR SENDING HARQ-ACK, APPARATUS, DEVICE, AND MEDIUM

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 322 days.

(21) Appl. No.: 18/278,621

(22) PCT Filed: Feb. 26, 2021

(86) PCT No.: PCT/CN2021/078258

§ 371 (c)(1),
(2) Date: Aug. 23, 2023

(87) PCT Pub. No.: WO2022/178864

PCT Pub. Date: Sep. 1, 2022

(65) Prior Publication Data

US 2024/0305432 A1 Sep. 12, 2024

(51) Int. Cl.
*H04L 12/26* (2006.01)
*H04L 1/1829* (2023.01)
(Continued)

(52) U.S. Cl.
CPC .......... *H04L 5/0055* (2013.01); *H04L 1/1861* (2013.01); *H04W 72/232* (2023.01); *H04L 1/1812* (2013.01)

(58) Field of Classification Search
None
See application file for complete search history.

(56) References Cited

U.S. PATENT DOCUMENTS

2020/0295886 A1 9/2020 Gou et al.
2021/0092759 A1* 3/2021 Xiong ............... H04W 72/0446

FOREIGN PATENT DOCUMENTS

CN 109842477 A 6/2019
CN 110535587 A 12/2019
(Continued)

OTHER PUBLICATIONS

The State Intellectual Property Office of People's Republic of China, "The First Office Action" issued in Application No. 202180000570.9 dated Aug. 7, 2024, with English translation, (14p).

(Continued)

*Primary Examiner* — Zewdu A Beyen
(74) *Attorney, Agent, or Firm* — Arch & Lake LLP; Hao Tan; Shen Wang

(57) ABSTRACT

A method for determining a transmission parameter, a method for sending an HARQ-ACK, an apparatus, a device, and a storage medium, applied to the technical field of wireless communications, are provided. The method for determining a transmission parameter includes: determining a first set, the first set including a plurality of consecutive integer elements, where the integer elements indicate a timeslot interval between a PDSCH and a channel for feeding back an HARQ-ACK of the PDSCH.

13 Claims, 4 Drawing Sheets

(51) Int. Cl.
*H04L 5/00* (2006.01)
*H04W 72/232* (2023.01)
*H04L 1/1812* (2023.01)

(56) References Cited

FOREIGN PATENT DOCUMENTS

| | | | |
|---|---|---|---|
| CN | 111294168 | A | 6/2020 |
| CN | 111585727 | A | 8/2020 |
| WO | 2020164358 | A1 | 8/2020 |

OTHER PUBLICATIONS

International Search Report of PCT/CN2021/078258 dated Nov. 15, 2021 with English translation, (6p).
Xiaomi, "PDSCH/PUSCH for NR 52.6-71 GHz", 3GPP TSG RAN WG1 #104, R1-2101112, e-Meeting, Jan. 25-Feb. 5, 2021, (4p).
Huawei, HiSilicon, "PDSCH/PUSCH enhancements for 52-71GHz band", 3GPP TSG RAN WG1 Meeting #104-e, R1-2100201, E-meeting, Jan. 25-Feb. 5, 2021, (16p).
LG Electronics, "PDSCH/PUSCH enhancements to support NR above 52.6 GHz", 3GPP TSG RAN WG1 #104-e R1-2100896, e-Meeting, Jan. 25-Feb. 5, 2021, (14p).

* cited by examiner

METHOD FOR DETERMINING TRANSMISSION PARAMETER, METHOD FOR SENDING HARQ-ACK, APPARATUS, DEVICE, AND MEDIUM

CROSS-REFERENCE

The present application is the U.S. National Stage of International Application No. PCT/CN2021/078258, filed on Feb. 26, 2021, the contents of which are incorporated herein by reference in their entireties for all purposes.

TECHNICAL FIELD

The present disclosure relates to the field of wireless communication technologies, and more particularly, to a method for determining a transmission parameter, a method for sending a HARQ-ACK, an apparatus, a device and a storage medium.

BACKGROUND

In order to ensure scheduling flexibility, one Downlink Control Information (DCI) can schedule one Physical Downlink Shared channel (PDSCH) or one Physical Uplink Shared channel (PUSCH).

When a Sub-Carrier Space (SCS) is 960 khz, a corresponding slot duration is 1/64 ms. In a case where the sub-carrier space is relatively large and the slot duration is relatively short, DCI blind detection overhead will be excessive if each PDSCH is scheduled with one separate DCI.

In a Multi Transmission Time Interval (multi-TTI) design, one DCI can schedule PDSCHs/PUSCHs in a plurality of slots.

An example in a multi-TTI PDSCH scheduling scenario is taken for illustration: one DCI can schedule four PDSCHs, and these four PDSCHs correspond to four consecutive slots in turn. The four PDSCHs can be used to transmit different data, that is, to transmit different Transport Blocks (TBs). By adopting the multi-TTI design, the number of DCIs can be reduced, thereby reducing complexity of the blind detection of the DCI by a UE.

In the multi-TTI PDSCH scheduling scenario, the number of PDSCHs scheduled by one DCI may be configured semi-statically by a higher layer, or may be, after a value range is indicated by a protocol or the value range is configured by a higher layer signaling, dynamically indicated by the scheduling DCI.

In the multi-TTI PDSCH scheduling scenario, it is necessary to feedback Hybrid Automatic Repeat reQuest Acknowledgements (HARQ-ACKs) for a plurality of PDSCHs on the same PUCCH.

SUMMARY

Embodiments of the present disclosure provide a method for determining a transmission parameter, a method for sending a HARQ-ACK, an apparatus, a device, and a storage medium.

According to a first aspect, there is provided a method for determining a transmission parameter, which is applied to a network-side device, and the method includes:

- determining a first set containing a plurality of consecutive integer elements,
- where an integer element indicates a slot interval between a PDSCH and a channel configured to feed back a HARQ-ACK for the PDSCH.

According to a second aspect, there is provided a method for sending a HARQ-ACK, which is applied to a user equipment, and the method includes:

- determining a first set containing a plurality of consecutive integer elements;
- where an integer element indicates a slot interval between a PDSCH and a channel configured to feed back a HARQ-ACK for the PDSCH;
- determining a first interval value, where the first interval value is a value among the plurality of consecutive integer elements in the first set;
- determining a slot of a channel configured to send a HARQ-ACK for a multi-TTI PDSCH according to the first interval value and a slot corresponding to a last PDSCH among the multi-TTI PDSCH; and
- sending the HARQ-ACK for the multi-TTI PDSCH through the channel.

According to a third aspect, there is provided a network-side device, including:

- a processor; and
- a memory configured to store executable instructions of the processor;
- wherein the processor is configured to execute the executable instructions in the memory to implement steps of the method for determining the transmission parameter according to the first aspect.

According to a fourth aspect, there is provided a user equipment, including:

- a processor; and
- a memory configured to store executable instructions of the processor;
- wherein the processor is configured to execute the executable instructions in the memory to implement steps of the method for sending the HARQ-ACK according to the second aspect.

According to a fifth aspect, there is provided a non-transitory computer readable storage medium having executable instructions stored thereon which, when executed by a processor, implement steps of the method for determining the transmission parameter according to the first aspect or steps of the method for sending the HARQ-ACK according to the second aspect.

It should be noted that the above general description and the following detailed description are merely illustrative and explanatory and should not be construed as limiting of the present disclosure.

BRIEF DESCRIPTION OF THE DRAWINGS

The drawings described here are used to provide a further understanding of embodiments of the present disclosure, and constitute a part of the present disclosure. Illustrative embodiments of the embodiments of the present disclosure and their description are used to explain the embodiments of the present disclosure, and do not constitute improper limitations to the embodiments of the present disclosure, in which.

DETAILED DESCRIPTION

Figure 1:
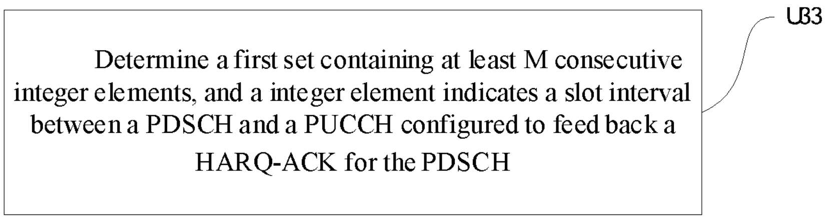
FIG. 1 is a flowchart showing a method for determining a transmission parameter according to an embodiment of the present disclosure.

Embodiments of the present disclosure will be further described in conjunction with the drawings and implementations.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of apparatuses and methods consistent with some aspects related to the present disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

For making it convenient for those skilled in the art to understand, multiple implementation modes are listed in the embodiments of the disclosure to describe the technical solutions of the embodiments of the disclosure clearly. Of course, those skilled in the art can understood that multiple embodiments provided in the embodiments of the disclosure can be executed independently, or can be combined with methods of the other embodiments in the embodiments of the disclosure for execution together, or may be executed independently or after combined with some methods in other related technologies. No limits are made thereto in the embodiments of the disclosure.

A Type1 codebook is a HARQ-ACK feedback mode with a fixed HARQ-ACK codebook size. HARQ-ACKs for effective PDSCH candidate time-frequency resources in all slots contained in a fixed-size feedback window is fed back on a channel that feeds back a HARQ-ACK.

Configuration information about the Type1 HARQ-ACK codebook includes:

Configuration information 1: a first set (known as K1 set) is agreed by a protocol or configured through a higher layer signaling. This K1 set contains L integer elements, and each integer element indicates a slot interval between a PDSCH and a channel configured to feed back a HARQ-ACK for the PDSCH. The K1 set is $\{k_1, k_2, \ldots, k_L\}$.

A default K1 set specified by the protocol is {1, 2, 3, 4, 5, 6, 7, 8}. The K1 set configured by a base station contains at most 8 values from 0 to 15. Alternatively, in some protocols, the K1 set configured by the base station contains −1 and at most 8 values from 0 to 15.

Configuration information 2: a first interval value indicated in DCI is a value in the K1 set. The first interval value is denoted by $k_i$.

Configuration information 3: a PDSCH scheduled by the DCI is in a slot N (a slot whose position identity is N).

According to the above-mentioned configuration information, a user equipment will send a HARQ-ACK for the PDSCH scheduled by the DCI on a channel in a slot $N+k_i$.

A feedback window corresponding to the Type1 HARQ-ACK codebook that can be contained in the channel that feeds back the HARQ-ACK is a window composed of slots: {slot $N+k_i-k_1$, slot $N+k_i-k_2$, . . . slot $N+k_i-k_{i-1}$, slot N, slot $N+k_i-k_{i+1}$, . . . , slot $N+k_i-k_L$}

A manner to determine this window can be understood as performing forwards reverse deduction on slot $N+k_i$ of the channel by each integer value in the K1 set, and forming the feedback window from individual slots obtained through the reverse deduction. That is, the channel for the HARQ-ACK in the slot $N+k_i$ needs to contain HARQ-ACK information for each PDSCH in the feedback window.

A PDSCH candidate time-frequency resource in a certain slot in this feedback window is not scheduled, or there is an actual PDSCH scheduling, but the DCI indicates that the HARQ-ACK for the PDSCH is not fed back in the slot $N+k_i$, a feedback result corresponding to the PDSCH candidate time-frequency resource in this slot is a Negative Acknowledgement (NACK).

When one DCI schedules multi-TTI PDSCHs, in the case of using the Type1 HARQ-ACK codebook, after the first interval value is indicated in the DCI, the Type1 HARQ-ACK codebook determined according to the first interval value cannot include HARQ-ACK information for all PDSCHs scheduled by the DCI.

For example:

The multi-TTI PDSCHs scheduled by one DCI include M PDSCHs in total, and slots corresponding to the M PDSCHs in turn are: slot n, slot n+1, . . . , slot n+M−1.

The configured K1 set contains L values, and the K1 set is $\{k_1, k_2, \ldots, k_L\}$.

The first interval value indicated in the DCI is a value in the K1 set. The first interval value is denoted by $k_i$.

The user equipment will send the HARQ-ACK for the PDSCH scheduled by the DCI on a channel in slot $n+M-1+k_i$.

The feedback window corresponding to the Type1 HARQ-ACK codebook that can be contained in the channel that feeds back the HARQ-ACK is a window composed of slots: {slot $n+M-1+k_i-k_1$, slot $n+M-1+k_i-k_2$, . . . , slot $n+M-1+k_i-k_{i-1}$, slot n+M−1, slot $n+M-1+k_i-k_{i+1}$, . . . , slot $n+M-1+k_i-k_L$}.

It is required that this window has to include the slot where each PDSCH among the multi-TTI PDSCHs is located, that is, each slot in {slot n, slot n+1, . . . , slot n+M−1}.

Whether the requirement can be realized is related to both the semi-statically configured K1 set and the first interval value dynamically indicated in the DCI. In the case of inappropriate configuration of the K1 set itself, no matter which value in the K1 set is indicated in the DCI, the above requirement cannot be met.

Based on the above information, it can be known that configuring the K1 set is a basic premise to meet the above requirement. Only when an appropriate K1 set is configured, the DCI can indicate an appropriate first interval value, so that the semi-static codebook on the channel that feeds back the HARQ-ACK can perform the HARQ-ACK feedback on all PDSCHs among the scheduled multi-TTI PDSCHs.

It should be noted that the channel configured to feed back the HARQ-ACK described in the present disclosure may be a Physical Uplink Control Channel (PUCCH) or a Physical Uplink Shared Channel (PUSCH), which is not limited here.

Embodiments of the present disclosure provide a method for determining a transmission parameter, which is applied to a network-side device. For example, the network-side device is a base station device.

Referring to FIG. 1, FIG. 1 is a flowchart showing a method for determining a transmission parameter according to an embodiment of the present disclosure. As shown in FIG. 1, the method for determining the transmission parameter includes:

in step S11, a first set is determined, and the first set contains at least M consecutive integer elements.

The integer element indicates a slot interval between a PDSCH and a channel configured to feed back a HARQ-ACK for the PDSCH. M is an integer greater than 1.

In an implementation of the present disclosure, M is a preset fixed value. In an implementation of the present disclosure, M is the preset fixed value, and M is the maximum number of PDSCHs, among the multi-TTI PDSCHs, that can be scheduled by a single DCI.

In an implementation of the present disclosure, M is the preset fixed value, and M is the number of PDSCHs, among the multi-TTI PDSCHs, that are scheduled by the single DCI.

In an implementation of the present disclosure, M is a fixed value specified in a protocol.

In an implementation of the present disclosure, M is the fixed value specified in the protocol, and M is the maximum number of PDSCHs, among the multi-TTI PDSCHs, that can be scheduled by the single DCI.

In an implementation of the present disclosure, M is the fixed value specified in the protocol, and M is the number of PDSCHs, among the multi-TTI PDSCHs, that are scheduled by the single DCI.

In an implementation of the present disclosure, M is an integer greater than 1 and less than or equal to 8.

In embodiments of the present disclosure, it is determined that the first set contains the at least M consecutive integer elements, and in a case where a value of M is set reasonably, it provides a basic condition for indication of an appropriate first interval value by the DCI. When the DCI indicates the appropriate first interval value, a codebook on the channel that feeds back the HARQ-ACK can perform the HARQ-ACK feedback on all PDSCHs among the scheduled multi-TTI PDSCHs.

Embodiments of the present disclosure provide a method for determining a transmission parameter, which is applied to a network-side device. The method for determining the transmission parameter includes:

a first set is determined, and the first set contains at least M consecutive integer elements. The integer element indicates a slot interval between a PDSCH and a channel configured to feed back a HARQ-ACK for the PDSCH.

M is the maximum number of PDSCHs, among multi-TTI PDSCHs, that can be scheduled by a single DCI.

In embodiments of the present disclosure, it is determined that the first set contains the at least M consecutive integer elements, so that the number of consecutive integer elements contained in the first set is greater than or equal to the maximum number of PDSCHs among the multi-TTI PDSCHs that can be scheduled by the single DCI, which provides the basic condition for the indication of the appropriate first interval value by the DCI. When the DCI indicates the appropriate first interval value, the codebook on the channel that feeds back the HARQ-ACK can perform the HARQ-ACK feedback on all PDSCHs among the scheduled multi-TTI PDSCHs.

Embodiments of the present disclosure provide a method for determining a transmission parameter, which is applied to a network-side device. The method for determining the transmission parameter includes:

a first set is determined, and the first set contains at least M consecutive integer elements. The integer element indicates a slot interval between a PDSCH and a channel configured to feed back a HARQ-ACK for the PDSCH.

M is the number of PDSCHs, among multi-TTI PDSCHs, that are scheduled by a single DCI.

The number of PDSCHs, among the multi-TTI PDSCHs, that are scheduled by the single DCI refers to the number of schedulings completed by the DCI for individual PDSCHs among the multi-TTI PDSCHs, which is less than or equal to the maximum number of PDSCHs, among the multi-TTI PDSCHs, that can be scheduled by the single DCI.

In embodiments of the present disclosure, it is determined that the first set contains the at least M consecutive integer elements, so that the number of consecutive integer elements contained in the first set is greater than or equal to the number of PDSCHs, among the multi-TTI PDSCHs, that are scheduled by the single DCI, which provides the basic condition for the indication of the appropriate first interval value by the DCI. When the DCI indicates the appropriate first interval value, the codebook on the channel that feeds back the HARQ-ACK can perform the HARQ-ACK feedback on all PDSCHs among the scheduled multi-TTI PDSCHs.

Embodiments of the present disclosure provide a method for determining a transmission parameter, which is applied to a network-side device. The method includes:

a first set is determined, and the first set contains M consecutive integer elements. The integer element indicates a slot interval between a PDSCH and a channel configured to feed back a HARQ-ACK for the PDSCH. M is the maximum number of PDSCHs, among multi-TTI PDSCHs, that can be scheduled by a single DCI, or M is the number of PDSCHs, among the multi-TTI PDSCHs, that are scheduled by the single DCI.

It is determined that a first interval value is the minimum value among the M consecutive integer elements.

In embodiments of the present disclosure, it is determined that the first set contains the M consecutive integer elements, so that the number of consecutive integer elements contained in the first set is equal to the maximum number of PDSCHs, among the multi-TTI PDSCHs, that can be scheduled by the single DCI, or equal to the number of PDSCHs, among the multi-TTI PDSCHs, that are scheduled by the single DCI, which provides the basic condition for the indication of the appropriate first interval value by the DCI. When the first interval value indicated by the DCI is the minimum value among the M consecutive integer elements, the codebook on the channel that feeds back the HARQ- ACK can perform the HARQ-ACK feedback on all PDSCHs among the scheduled multi-TTI PDSCHs.

In an example:

Multi-TTI PDSCHs scheduled by one DCI include four PDSCHs in total, and slots where the four PDSCHs are located are slot n, slot n+1, slot n+2, and slot n+3 in turn.

The first set, that is, the K1 set, contains four consecutive integer elements, which are specifically {0, 1, 2, 3}.

The number of consecutive integer elements contained in the first set, that is, the K1 set, is the same as the number of PDSCHs among the multi-TTI PDSCHs.

It is determined that the first interval value is the minimum value among the four consecutive integer elements, that is, 0.

It is determined that the feedback slot is slot n+3+T, that is, slot n+3, and the HARQ-ACK for the multi-TTI PDSCH scheduled by the DCI is sent on a PUCCH in this feedback slot.

The feedback window corresponding to the Type1 HARQ-ACK codebook that can be contained in the PUCCH includes: {slot n+3, slot n+2, slot n+1, slot n}. The feedback window contains slots corresponding to individual PDSCHs among the multi-TTI PDSCHs, so that the codebook on the PUCCH can perform the HARQ-ACK feedback on all PDSCHs among the scheduled multi-TTI PDSCHs.

Embodiments of the present disclosure provide a method for determining a transmission parameter, which is applied to a network-side device. The method includes:

a first set is determined, and the first set contains N consecutive integer elements. The integer element indicates a slot interval between a PDSCH and a PUCCH configured to feed back a HARQ-ACK for the PDSCH. N is greater than M, and M is the maximum number of PDSCHs, among multi-TTI PDSCHs, that can be scheduled by a single DCI, or M is the number of PDSCHs, among the multi-TTI PDSCHs, that are scheduled by the single DCI.

It is determined that a first interval value is the minimum value among the N consecutive integer elements.

In embodiments of the present disclosure, it is determined that the first set contains the N consecutive integer elements, so that the number of consecutive integer elements contained in the first set is greater than the maximum number of PDSCHs, among the multi-TTI PDSCHs, that can be scheduled by the single DCI, or greater than the number of PDSCHs, among the multi-TTI PDSCHs, that are scheduled by the single DCI, which provides the basic condition for the indication of the appropriate first interval value by the DCI. When the first interval value indicated by the DCI is the minimum value among the N consecutive integer elements, the codebook on the channel that feeds back the HARQ-ACK can perform the HARQ-ACK feedback on all PDSCHs among the scheduled multi-TTI PDSCHs.

In an example:

Multi-TTI PDSCHs scheduled by one DCI include four PDSCHs in total, and slots where the four PDSCHs are located are slot n, slot n+1, slot n+2, and slot n+3 in turn.

The first set, that is, the K1 set, contains six consecutive integer elements, which are specifically {0, 1, 2, 3, 4, 5}.

The number of consecutive integer elements contained in the first set, that is, the K1 set, is greater than the number of PDSCHs among the multi-TTI PDSCHs.

It is determined that the first interval value is the minimum value among the six consecutive integer elements, that is, 0.

It is determined that the feedback slot is slot n+3+T, that is, slot n+3, and the HARQ-ACK for the multi-TTI PDSCH scheduled by the DCI is sent on a PUCCH in this feedback slot.

The feedback window corresponding to the Type1 HARQ-ACK codebook that can be contained in the PUCCH includes: {slot n+3, slot n+2, slot n+1, slot n, slot n−1, slot n−2}. The feedback window contains slots corresponding to individual PDSCHs among the multi-TTI PDSCHs, so that the codebook on the PUCCH can perform the HARQ-ACK feedback on all PDSCHs among the scheduled multi-TTI PDSCHs.

Embodiments of the present disclosure provide a method for determining a transmission parameter, which is applied to a network-side device. The method includes:

a first set is determined, and the first set contains N consecutive integer elements. The integer element indicates a slot interval between a PDSCH and a PUCCH configured to feed back a HARQ-ACK for the PDSCH. N is greater than M, and M is the maximum number of PDSCHs, among multi-TTI PDSCHs, that can be scheduled by a single DCI, or M is the number of PDSCHs, among the multi-TTI PDSCHs, that are scheduled by the single DCI.

It is determined that a first interval value is a value among N−M+1 consecutive integer elements of N consecutive integer elements, and the N−M+1 consecutive integer elements contain the smallest N−M+1 integer elements among the N consecutive integer elements.

In embodiments of the present disclosure, it is determined that the first set contains the N consecutive integer elements, so that the number of consecutive integer elements contained in the first set is greater than the maximum number of PDSCHs, among the multi-TTI PDSCHs, that can be scheduled by the single DCI, or greater than the number of PDSCHs, among the multi-TTI PDSCHs, that are scheduled by the single DCI, which provides the basic condition for the indication of the appropriate first interval value by the DCI. When the first interval value indicated by the DCI is the value among the at least N−M+1 consecutive integer elements of the N consecutive integer elements, and the at least N−M+1 consecutive integer elements contain the smallest N−M+1 integer elements among the N consecutive integer elements, the codebook on the channel that feeds back the HARQ-ACK can perform the HARQ-ACK feedback on all PDSCHs among the scheduled multi-TTI PDSCHs.

In an example:

Multi-TTI PDSCHs scheduled by one DCI include four PDSCHs in total, and slots where the four PDSCHs are located are slot n, slot n+1, slot n+2, and slot n+3 in turn.

The first set, that is, the K1 set, contains six consecutive integer elements, which are specifically {0, 1, 2, 3, 4, 5}.

The number of consecutive integer elements contained in the first set, that is, the K1 set, is greater than the number of PDSCHs among the multi-TTI PDSCHs.

It is determined that the first interval value is the second smallest value among the six consecutive integer elements, that is, 1.

It is determined that the feedback slot is slot n+3+T, that is, slot n+4, and the HARQ-ACK for the multi-TTI PDSCH scheduled by the DCI is sent on a PUCCH in this feedback slot.

The feedback window corresponding to the Type1 HARQ-ACK codebook that can be contained in the PUCCH includes: {slot n+4, slot n+3, slot n+2, slot n+1, slot n, slot n−1}. The feedback window contains slots corresponding to individual PDSCHs among the multi-TTI PDSCHs, so that the codebook on the PUCCH can perform the HARQ-ACK feedback on all PDSCHs among the scheduled multi-TTI PDSCHs.

Embodiments of the present disclosure provide a method for determining a transmission parameter, which is applied to a network-side device. The method includes:

a first set is determined, and the first set contains at least M consecutive integer elements. The integer element indicates a slot interval between a PDSCH and a PUCCH configured to feed back a HARQ-ACK for the PDSCH, and M is the maximum number of PDSCHs, among multi-TTI PDSCHs, that can be scheduled by a single DCI, or M is the number of PDSCHs, among the multi-TTI PDSCHs, that are scheduled by the single DCI.

The integer elements in the first set include: a set number of values from 0 to 15; or, −1 and a set number of values from 1 to 15.

The set number is less than or equal to 8.

In embodiments of the present disclosure, the set number of integer elements contained in the first set meets a configuration requirement of the protocol or the base station.

Figure 2:
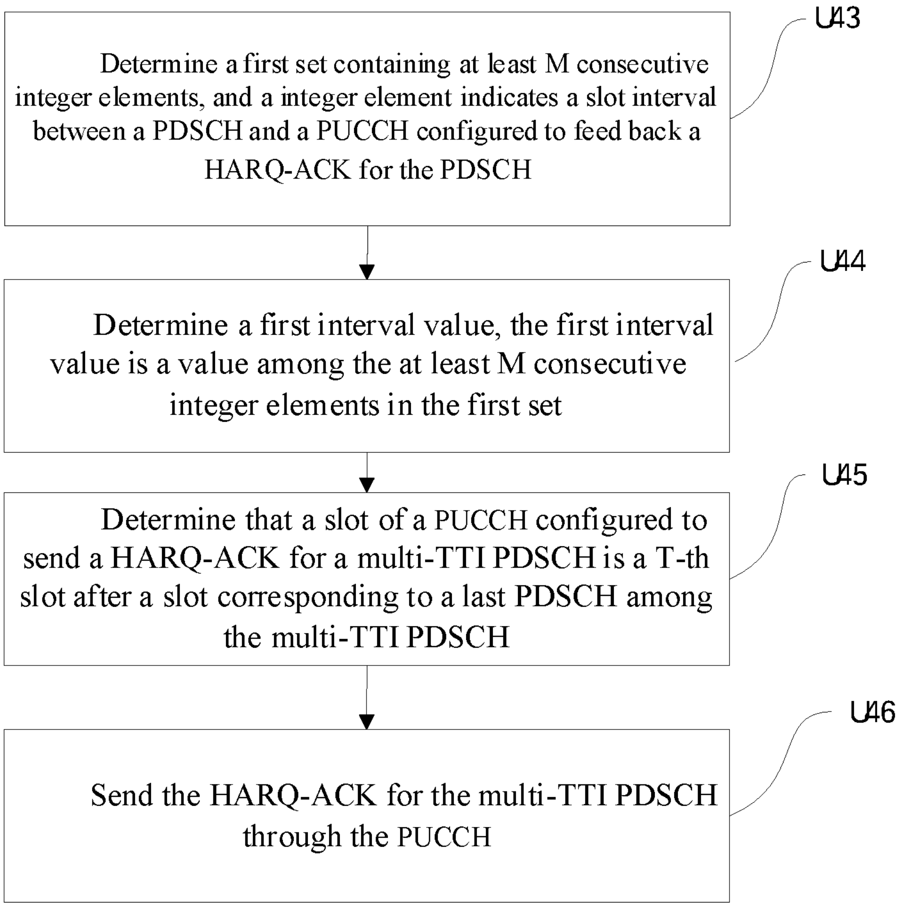
FIG. 2 is a flowchart showing a method for sending a HARQ-ACK according to an embodiment of the present disclosure.

Embodiments of the present disclosure provide a method for sending a HARQ-ACK, which is applied to a user equipment. Referring to FIG. 2, FIG. 2 is a flowchart showing a method for sending a HARQ-ACK according to an embodiment of the present disclosure. As shown in FIG. 2, the method for sending the HARQ-ACK includes steps S21 to S24.

In the step S21, a first set is determined, the first set contains at least M consecutive integer elements, and the integer element indicates a slot interval between a PDSCH and a PUCCH configured to feed back a HARQ-ACK for the PDSCH. M is an integer greater than 1.

In the step S22, a first interval value is determined, and the first interval value is a value among the at least M consecutive integer elements in the first set.

In the step S23, a slot of a PUCCH configured to send a HARQ-ACK for a multi-TTI PDSCH is determined according to the first interval value and a slot corresponding to a last PDSCH among the multi-TTI PDSCH.

In the step S24, the HARQ-ACK for the multi-TTI PDSCH is sent through the PUCCH.

In an implementation of the present disclosure, the determining the slot of the PUCCH configured to send the HARQ-ACK for the multi-TTI PDSCH according to the first interval value and the slot corresponding to the last PDSCH among the multi-TTI PDSCH in the step S23 includes: determining that the slot of the PUCCH configured to send the HARQ-ACK for the multi-TTI PDSCH is a T-th slot after the slot corresponding to the last PDSCH among the multi-TTI PDSCH.

In an implementation of the present disclosure, M is a preset fixed value.

In an implementation of the present disclosure, M is the preset fixed value, and M is the maximum number of PDSCHs, among the multi-TTI PDSCHs, that can be scheduled by a single DCI.

In an implementation of the present disclosure, M is the preset fixed value, and M is the number of PDSCHs, among the multi-TTI PDSCHs, that are scheduled by the single DCI.

In an implementation of the present disclosure, M is a fixed value specified in a protocol.

In an implementation of the present disclosure, M is the fixed value specified in the protocol, and M is the maximum number of PDSCHs, among the multi-TTI PDSCHs, that can be scheduled by the single DCI.

In an implementation of the present disclosure, M is the fixed value specified in the protocol, and M is the number of PDSCHs, among the multi-TTI PDSCHs, that are scheduled by the single DCI.

In an implementation of the present disclosure, M is an integer greater than 1 and less than or equal to 8.

In embodiments of the present disclosure, it is determined that the first set contains the at least M consecutive integer elements, and in a case where a value of M is set reasonably, it provides a basic condition for indication of an appropriate first interval value by the DCI. When the DCI indicates the appropriate first interval value, the codebook on the channel that feeds back the HARQ-ACK can perform the HARQ-ACK feedback on all PDSCHs among the scheduled multi-TTI PDSCHs.

Embodiments of the present disclosure provide a method for sending a HARQ-ACK, which is applied to a user equipment. The method for sending the HARQ-ACK includes the following steps.

A first set is determined, the first set contains at least M consecutive integer elements, and the integer element indicates a slot interval between a PDSCH and a PUCCH configured to feed back a HARQ-ACK for the PDSCH. M is the maximum number of PDSCHs, among multi-TTI PDSCHs, that can be scheduled by a single DCI.

A first interval value is determined, and the first interval value is a value among the at least M consecutive integer elements in the first set.

A slot of a PUCCH configured to send a HARQ-ACK for a multi-TTI PDSCH is determined according to the first interval value and a slot corresponding to a last PDSCH among the multi-TTI PDSCH.

The HARQ-ACK for the multi-TTI PDSCH is sent through the PUCCH.

In embodiments of the present disclosure, in response to that the first set contains the at least M consecutive integer elements, the number of consecutive integer elements contained in the first set is greater than or equal to the maximum number of PDSCHs, among the multi-TTI PDSCHs, that can be scheduled by the single DCI, and the first interval value indicated by the DCI is a value among the at least M consecutive integer elements in the first set, when the first interval value indicated by the DCI is appropriate, the codebook on the channel that feeds back the HARQ-ACK can perform the HARQ-ACK feedback on all PDSCHs among the scheduled multi-TTI PDSCHs.

Embodiments of the present disclosure provide a method for sending a HARQ-ACK, which is applied to a user equipment. The method for sending the HARQ-ACK includes the following steps.

A first set is determined, the first set contains at least M consecutive integer elements, and the integer element indicates a slot interval between a PDSCH and a PUCCH configured to feed back a HARQ-ACK for the PDSCH. M is the number of PDSCHs, among multi-TTI PDSCHs, that are scheduled by a single DCI.

A first interval value is determined, and the first interval value is a value among the at least M consecutive integer elements in the first set.

A slot of a PUCCH configured to send a HARQ-ACK for a multi-TTI PDSCH is determined according to the first interval value and a slot corresponding to a last PDSCH among the multi-TTI PDSCH.

The HARQ-ACK for the multi-TTI PDSCH is sent through the PUCCH.

The number of PDSCHs, among the multi-TTI PDSCHs, that are scheduled by the single DCI refers to the number of schedulings completed by the DCI for individual PDSCHs among the multi-TTI PDSCHs, which is less than or equal to the maximum number of PDSCHs, among the multi-TTI PDSCHs, that can be scheduled by the single DCI.

In embodiments of the present disclosure, in response to that the first set contains the at least M consecutive integer elements, the number of consecutive integer elements contained in the first set is greater than or equal to the number of PDSCHs, among the multi-TTI PDSCHs, that are scheduled by the single DCI, and the first interval value indicated by the DCI is a value among the at least M consecutive integer elements in the first set, when the first interval value indicated by the DCI is appropriate, the codebook on the channel that feeds back the HARQ-ACK can perform the HARQ-ACK feedback on all PDSCHs among the scheduled multi-TTI PDSCHs.

Embodiments of the present disclosure provide a method for sending a HARQ-ACK, which is applied to a user equipment. The method for sending the HARQ-ACK includes the following steps.

A first set is determined, the first set contains M consecutive integer elements, and the integer element indicates a slot interval between a PDSCH and a PUCCH configured to feed back a HARQ-ACK for the PDSCH. M is the maximum number of PDSCHs, among multi-TTI PDSCHs, that can be scheduled by a single DCI, or M is the number of PDSCHs, among the multi-TTI PDSCHs, that are scheduled by the single DCI.

It is determined that a first interval value is the minimum value among the M consecutive integer elements.

A slot of a PUCCH configured to send a HARQ-ACK for a multi-TTI PDSCH is determined according to the first interval value and a slot corresponding to a last PDSCH among the multi-TTI PDSCH.

The HARQ-ACK for the multi-TTI PDSCH is sent through the PUCCH.

In embodiments of the present disclosure, in response to that the first set contains the M consecutive integer elements, the number of consecutive integer elements contained in the first set is equal to the maximum number of PDSCHs, among the multi-TTI PDSCHs, that can be scheduled by the single DCI, or equal to the number of PDSCHs, among the multi-TTI PDSCHs, that are scheduled by the single DCI, when the first interval value indicated by the DCI is the minimum value among the M consecutive integer elements, the codebook on the channel that feeds back the HARQ-ACK can perform the HARQ-ACK feedback on all PDSCHs among the scheduled multi-TTI PDSCHs.

In an example:

Multi-TTI PDSCHs scheduled by one DCI include four PDSCHs in total, and slots where the four PDSCHs are located are slot n, slot n+1, slot n+2, and slot n+3 in turn.

The first set, that is, the K1 set, contains four consecutive integer elements, which are specifically {0, 1, 2, 3}.

The number of consecutive integer elements contained in the first set, that is, the K1 set, is the same as the number of PDSCHs among the multi-TTI PDSCHs.

It is determined that the first interval value is the minimum value among the four consecutive integer elements, that is, 0.

It is determined that the feedback slot is slot n+3+T, that is, slot n+3, and the HARQ-ACK for the multi-TTI PDSCH scheduled by the DCI is sent on a PUCCH in this feedback slot.

The feedback window corresponding to the Type1 HARQ-ACK codebook that can be contained in the PUCCH includes: {slot n+3, slot n+2, slot n+1, slot n}. The feedback window contains slots corresponding to individual PDSCHs among the multi-TTI PDSCHs, so that the codebook on the PUCCH can perform the HARQ-ACK feedback on all PDSCHs among the scheduled multi-TTI PDSCHs.

Embodiments of the present disclosure provide a method for sending a HARQ-ACK, which is applied to a user equipment. The method for sending the HARQ-ACK includes the following steps.

A first set is determined, the first set contains N consecutive integer elements, and the integer element indicates a slot interval between a PDSCH and a PUCCH configured to feed back a HARQ-ACK for the PDSCH. N is greater than M, and M is the maximum number of PDSCHs, among multi-TTI PDSCHs, that can be scheduled by a single DCI, or M is the number of PDSCHs, among the multi-TTI PDSCHs, that are scheduled by the single DCI.

It is determined that a first interval value is the minimum value among the N consecutive integer elements.

A slot of a PUCCH configured to send a HARQ-ACK for a multi-TTI PDSCH is determined according to the first interval value and a slot corresponding to a last PDSCH among the multi-TTI PDSCH.

The HARQ-ACK for the multi-TTI PDSCH is sent through the PUCCH.

In embodiments of the present disclosure, in response to that the first set contains the N consecutive integer elements, and N is greater than the maximum number of PDSCHs, among the multi-TTI PDSCHs, that can be scheduled by the single DCI, or greater than the number of PDSCHs, among the multi-TTI PDSCHs, that are scheduled by the single DCI, when the first interval value indicated by the DCI is the minimum value among the N consecutive integer elements, the codebook on the channel that feeds back the HARQ-ACK can perform the HARQ-ACK feedback on all PDSCHs among the scheduled multi-TTI PDSCHs.

In an example:

Multi-TTI PDSCHs scheduled by one DCI include four PDSCHs in total, and slots where the four PDSCHs are located are slot n, slot n+1, slot n+2, and slot n+3 in turn.

The first set, that is, the K1 set, contains six consecutive integer elements, which are specifically {0, 1, 2, 3, 4, 5}.

The number of consecutive integer elements contained in the first set, that is, the K1 set, is greater than the number of PDSCHs among the multi-TTI PDSCHs.

It is determined that the first interval value is the minimum value among the six consecutive integer elements, that is, 0.

It is determined that the feedback slot is slot n+3+T, that is, slot n+3, and the HARQ-ACK for the multi-TTI PDSCH scheduled by the DCI is sent on a PUCCH in this feedback slot.

The feedback window corresponding to the Type1 HARQ-ACK codebook that can be contained in the PUCCH includes: {slot n+3, slot n+2, slot n+1, slot n, slot n−1, slot n−2}. The feedback window contains slots corresponding to individual PDSCHs among the multi-TTI PDSCHs, so that the codebook on the PUCCH can perform the HARQ-ACK feedback on all PDSCHs among the scheduled multi-TTI PDSCHs.

Embodiments of the present disclosure provide a method for sending a HARQ-ACK, which is applied to a user equipment. The method for sending the HARQ-ACK includes the following steps.

A first set is determined, the first set contains N consecutive integer elements, and the integer element indicates a slot interval between a PDSCH and a PUCCH configured to feed back a HARQ-ACK for the PDSCH. N is greater than M, and M is the maximum number of PDSCHs, among multi-TTI PDSCHs, that can be scheduled by a single DCI, or M is the number of PDSCHs, among the multi-TTI PDSCHs, that are scheduled by the single DCI.

It is determined that a first interval value is a value among at least N−M+1 consecutive integer elements of N consecutive integer elements, and the at least N−M+1 consecutive integer elements contain the smallest N−M+1 integer elements among the N consecutive integer elements.

A slot of a PUCCH configured to send a HARQ-ACK for a multi-TTI PDSCH is determined according to the first interval value and a slot corresponding to a last PDSCH among the multi-TTI PDSCH.

The HARQ-ACK for the multi-TTI PDSCH is sent through the PUCCH.

In embodiments of the present disclosure, in response to that the first set contains the N consecutive integer elements, N is greater than the maximum number of PDSCHs, among the multi-TTI PDSCHs, that can be scheduled by the single DCI, or greater than the number of PDSCHs, among the multi-TTI PDSCHs, that are scheduled by the single DCI, the first interval value indicated by the DCI is the value among the at least N−M+1 consecutive integer elements of the N consecutive integer elements, and the at least N−M+1 consecutive integer elements contain the smallest N−M+1 integer elements among the N consecutive integer elements, the codebook on the channel that feeds back the HARQ-ACK can perform the HARQ-ACK feedback on all PDSCHs among the scheduled multi-TTI PDSCHs.

Embodiments of the present disclosure provide a method for sending a HARQ-ACK, which is applied to a user equipment. The method for sending the HARQ-ACK includes the following steps.

A first set is determined, the first set contains at least M consecutive integer elements, and the integer element indicates a slot interval between a PDSCH and a PUCCH configured to feed back a HARQ-ACK for the PDSCH. M is the maximum number of PDSCHs, among multi-TTI PDSCHs, that can be scheduled by a single DCI, or M is the number of PDSCHs, among the multi-TTI PDSCHs, that are scheduled by the single DCI.

In an embodiment of the present disclosure, the integer elements of the first set include: a set number of values from 0 to 15; or, −1 and a set number of values from 1 to 15.

The set number may be less than or equal to 8.

A first interval value is determined, and the first interval value is a value among the at least M consecutive integer elements in the first set.

A slot of a PUCCH configured to send a HARQ-ACK for a multi-TTI PDSCH is determined according to the first interval value and a slot corresponding to a last PDSCH among the multi-TTI PDSCH.

The HARQ-ACK for the multi-TTI PDSCH is sent through the PUCCH.

In embodiments of the present disclosure, the set number of integer elements contained in the first set meets a configuration requirement of the protocol or the base station.

Figure 3:
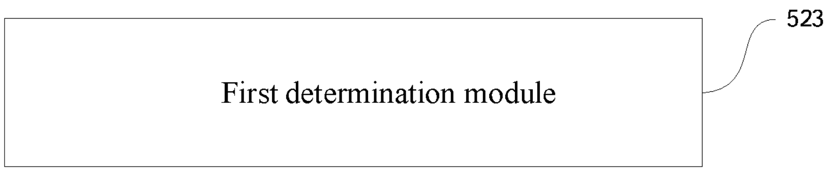
FIG. 3 is a structural diagram showing an apparatus for determining a transmission parameter according to an embodiment of the present disclosure.

Embodiments of the present disclosure provide an apparatus for determining a transmission parameter, which is applied to a network-side device. For example, the network-side device is a base station device. Referring to FIG. 3, FIG. 3 is a structural diagram showing an apparatus for determining a transmission parameter according to an embodiment of the present disclosure. As shown in FIG. 3, the apparatus for determining the transmission parameter includes:

a first determination module 301, configured to determine a first set, the first set contains at least M consecutive integer elements, and the integer element indicates a slot interval between a PDSCH and a PUCCH configured to feed back a HARQ-ACK for the PDSCH.

In an implementation of the present disclosure, M is a preset fixed value.

In an implementation of the present disclosure, M is the preset fixed value, and M is the maximum number of PDSCHs, among the multi-TTI PDSCHs, that can be scheduled by a single DCI.

In an implementation of the present disclosure, M is the preset fixed value, and M is the number of PDSCHs, among the multi-TTI PDSCHs, that are scheduled by the single DCI.

In an implementation of the present disclosure, M is a fixed value specified in a protocol.

In an implementation of the present disclosure, M is the fixed value specified in the protocol, and M is the maximum number of PDSCHs, among the multi-TTI PDSCHs, that can be scheduled by the single DCI.

In an implementation of the present disclosure, M is the fixed value specified in the protocol, and M is the number of PDSCHs, among the multi-TTI PDSCHs, that are scheduled by the single DCI.

In an implementation of the present disclosure, M is an integer greater than 1 and less than or equal to 8.

Embodiments of the present disclosure provide an apparatus for determining a transmission parameter, which is applied to a network-side device. For example, the network-side device is a base station device. The apparatus for determining the transmission parameter includes:

a first determination module 301, configured to determine a first set, the first set contains at least M consecutive integer elements, and the integer element indicates a slot interval between a PDSCH and a PUCCH configured to feed back a HARQ-ACK for the PDSCH. M is the maximum number of PDSCHs, among multi-TTI PDSCHs, that can be scheduled by a single DCI.

Embodiments of the present disclosure provide an apparatus for determining a transmission parameter, which is applied to a network-side device. For example, the network-side device is a base station device. The apparatus for determining the transmission parameter includes:

a first determination module 301, configured to determine a first set, the first set contains at least M consecutive integer elements, and the integer element indicates a slot interval between a PDSCH and a PUCCH configured to feed back a HARQ-ACK for the PDSCH. M is the number of PDSCHs, among multi-TTI PDSCHs, that are scheduled by a single DCI.

The number of PDSCHs, among the multi-TTI PDSCHs, that are scheduled by the single DCI refers to the number of schedulings completed by the DCI for individual PDSCHs among the multi-TTI PDSCHs, which is less than or equal to the maximum number of PDSCHs, among the multi-TTI PDSCHs, that can be scheduled by the single DCI.

Embodiments of the present disclosure provide an apparatus for determining a transmission parameter, which is applied to a network-side device. The apparatus for determining the transmission parameter includes:

a first determination module 301, configured to determine a first set, the first set contains M consecutive integer elements, and the integer element indicates a slot interval between a PDSCH and a PUCCH configured to feed back a HARQ-ACK for the PDSCH; and M is the maximum number of PDSCHs, among multi-TTI PDSCHs, that can be scheduled by a single DCI, or M is the number of PDSCHs, among the multi-TTI PDSCHs, that are scheduled by the single DCI; and a second determination module, configured to determine that a first interval value is the minimum value among the M consecutive integer elements.

Embodiments of the present disclosure provide an apparatus for determining a transmission parameter, which is applied to a network-side device. For example, the network-side device is a base station device. The apparatus for determining the transmission parameter includes:

a first determination module 301, configured to determine a first set, the first set contains N consecutive integer elements, and the integer element indicates a slot interval between a PDSCH and a PUCCH configured to feed back a HARQ-ACK for the PDSCH; M is the maximum number of PDSCHs, among multi-TTI PDSCHs, that can be scheduled by a single DCI, or M is the number of PDSCHs, among the multi-TTI PDSCHs, that are scheduled by the single DCI; and N is greater than M; and a third determination module, configured to determine that a first interval value is the minimum value among the N consecutive integer elements.

Embodiments of the present disclosure provide an apparatus for determining a transmission parameter, which is applied to a network-side device. The apparatus for determining the transmission parameter includes:

a first determination module 301, configured to determine a first set, the first set contains N consecutive integer elements, and the integer element indicates a slot interval between a PDSCH and a PUCCH configured to feed back a HARQ-ACK for the PDSCH; M is the maximum number of PDSCHs, among multi-TTI PDSCHs, that can be scheduled by a single DCI, or M is the number of PDSCHs, among the multi-TTI PDSCHs, that are scheduled by the single DCI; and N is greater than M; and a fourth determination module, configured to determine that a first interval value is a value among N−M+1 consecutive integer elements of N consecutive integer elements, and the N−M+1 consecutive integer elements contain the smallest N−M+1 integer elements among the N consecutive integer elements.

Figure 4:
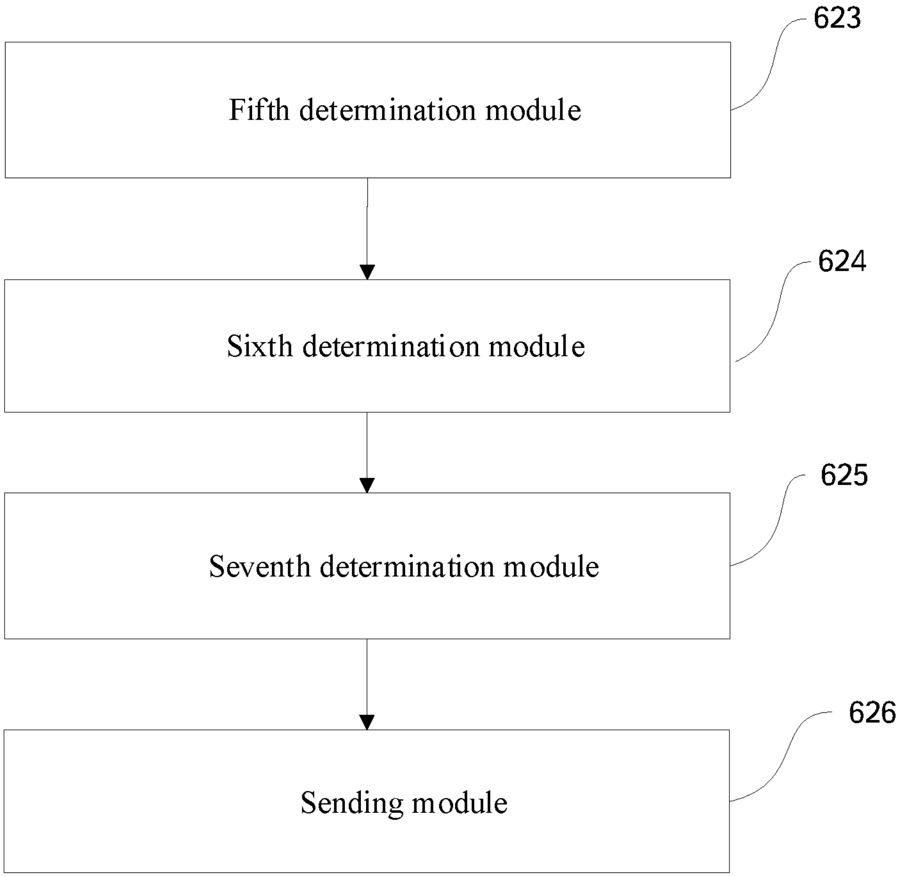
FIG. 4 is a structural diagram showing an apparatus for sending a HARQ-ACK according to an embodiment of the present disclosure.

Embodiments of the present disclosure provide an apparatus for sending a HARQ-ACK, which is applied to a user equipment. Referring to FIG. 4, FIG. 4 is a structural diagram showing an apparatus for sending a HARQ-ACK according to an embodiment of the present disclosure. As shown in FIG. 4, the apparatus for sending the HARQ-ACK includes:

a fifth determination module 401, configured to determine a first set, the first set contains at least M consecutive integer elements, and the integer element indicates a slot interval between a PDSCH and a PUCCH configured to feed back a HARQ-ACK for the PDSCH; and M is the maximum number of PDSCHs, among multi-TTI PDSCHs, that can be scheduled by a single DCI, or M is the number of PDSCHs, among the multi-TTI PDSCHs, that are scheduled by the single DCI;

a sixth determination module 402, configured to determine a first interval value, and the first interval value is a value among the at least M consecutive integer elements in the first set;

a seventh determination module 403, configured to determine a slot of a PUCCH configured to send a HARQ-ACK for a multi-TTI PDSCH according to the first interval value and a slot corresponding to a last PDSCH among the multi-TTI PDSCH; and a sending module 404, configured to send the HARQ-ACK for the multi-TTI PDSCH through the PUCCH.

In an implementation of the present disclosure, M is a preset fixed value.

In an implementation of the present disclosure, M is the preset fixed value, and M is the maximum number of PDSCHs, among the multi-TTI PDSCHs, that can be scheduled by a single DCI.

In an implementation of the present disclosure, M is the preset fixed value, and M is the number of PDSCHs, among the multi-TTI PDSCHs, that are scheduled by the single DCI.

In an implementation of the present disclosure, M is a fixed value specified in a protocol.

In an implementation of the present disclosure, M is the fixed value specified in the protocol, and M is the maximum number of PDSCHs, among the multi-TTI PDSCHs, that can be scheduled by the single DCI.

In an implementation of the present disclosure, M is the fixed value specified in the protocol, and M is the number of PDSCHs, among the multi-TTI PDSCHs, that are scheduled by the single DCI.

In an implementation of the present disclosure, M is an integer greater than 1 and less than or equal to 8.

Embodiments of the present disclosure provide an apparatus for sending a HARQ-ACK, which is applied to a user equipment. The apparatus for sending the HARQ-ACK includes:

a fifth determination module 401, configured to determine a first set, the first set contains at least M consecutive integer elements, and the integer element indicates a slot interval between a PDSCH and a PUCCH configured to feed back a HARQ-ACK for the PDSCH; and M is the maximum number of PDSCHs, among multi-TTI PDSCHs, that can be scheduled by a single DCI, or M is the number of PDSCHs, among the multi-TTI PDSCHs, that are scheduled by the single DCI;

a sixth determination module 402, configured to determine a first interval value, and the first interval value is a value among the at least M consecutive integer elements in the first set;

a seventh determination module 403, configured to determine a slot of a PUCCH configured to send a HARQ-ACK for a multi-TTI PDSCH according to the first interval value and a slot corresponding to a last PDSCH among the multi-TTI PDSCH; and a sending module 404, configured to send the HARQ-ACK for the multi-TTI PDSCH through the PUCCH.

Embodiments of the present disclosure provide an apparatus for sending a HARQ-ACK, which is applied to a user equipment. The apparatus for sending the HARQ-ACK includes:

a fifth determination module, configured to determine a first set, the first set contains M consecutive integer elements, and the integer element indicates a slot interval between a PDSCH and a PUCCH configured to feed back a HARQ-ACK for the PDSCH; and M is the maximum number of PDSCHs, among multi-TTI PDSCHs, that can be scheduled by a single DCI, or M is the number of PDSCHs, among the multi-TTI PDSCHs, that are scheduled by the single DCI;

- a sixth determination module, configured to determine that a first interval value is the minimum value among the M consecutive integer elements;
- a seventh determination module, configured to determine a slot of a PUCCH configured to send a HARQ-ACK for a multi-TTI PDSCH according to the first interval value and a slot corresponding to a last PDSCH among the multi-TTI PDSCH; and
- a sending module, configured to send the HARQ-ACK for the multi-TTI PDSCH through the PUCCH.

Embodiments of the present disclosure provide an apparatus for sending a HARQ-ACK, which is applied to a user equipment. The apparatus for sending the HARQ-ACK includes:

- a fifth determination module, configured to determine a first set, the first set contains N consecutive integer elements, and the integer element indicates a slot interval between a PDSCH and a PUCCH configured to feed back a HARQ-ACK for the PDSCH; M is the maximum number of PDSCHs, among multi-TTI PDSCHs, that can be scheduled by a single DCI, or M is the number of PDSCHs, among the multi-TTI PDSCHs, that are scheduled by the single DCI; and N is greater than M;
- a sixth determination module, configured to determine that a first interval value is the minimum value among the N consecutive integer elements;
- a seventh determination module, configured to determine a slot of a PUCCH configured to send a HARQ-ACK for a multi-TTI PDSCH according to the first interval value and a slot corresponding to a last PDSCH among the multi-TTI PDSCH; and
- a sending module, configured to send the HARQ-ACK for the multi-TTI PDSCH through the PUCCH.

Embodiments of the present disclosure provide an apparatus for sending a HARQ-ACK, which is applied to a user equipment. The apparatus for sending the HARQ-ACK includes:

- a fifth determination module, configured to determine a first set, the first set contains N consecutive integer elements, and the integer element indicates a slot interval between a PDSCH and a PUCCH configured to feed back a HARQ-ACK for the PDSCH; M is the maximum number of PDSCHs, among multi-TTI PDSCHs, that can be scheduled by a single DCI, or M is the number of PDSCHs, among the multi-TTI PDSCHs, that are scheduled by the single DCI; and N is greater than M;
- a sixth determination module, configured to determine that a first interval value is a value among N−M+1 consecutive integer elements of the N consecutive integer elements, and the N−M+1 consecutive integer elements contain the smallest N−M+1 integer elements among the N consecutive integer elements;
- a seventh determination module, configured to determine a slot of a PUCCH configured to send a HARQ-ACK for a multi-TTI PDSCH according to the first interval value and a slot corresponding to a last PDSCH among the multi-TTI PDSCH; and
- a sending module, configured to send the HARQ-ACK for the multi-TTI PDSCH through the PUCCH.

Embodiments of the present disclosure provide a network-side device, including:

- a processor; and
- a memory configured to store executable instructions of the processor;
- the processor is configured to execute the executable instructions in the memory to implement steps of the method for determining the transmission parameter.

Embodiments of the present disclosure provide a user equipment, including:

- a processor; and
- a memory configured to store executable instructions of the processor;
- wherein the processor is configured to execute the executable instructions in the memory to implement steps of the method for sending the HARQ-ACK.

Embodiments of the present disclosure provide a non-transitory computer readable storage medium having executable instructions stored thereon which, when executed by a processor, implement the method for determining the transmission parameter.

Embodiments of the present disclosure provide a non-transitory computer readable storage medium having executable instructions stored thereon which, when executed by a processor, implement steps of the method for sending the HARQ-ACK.

Figure 5:
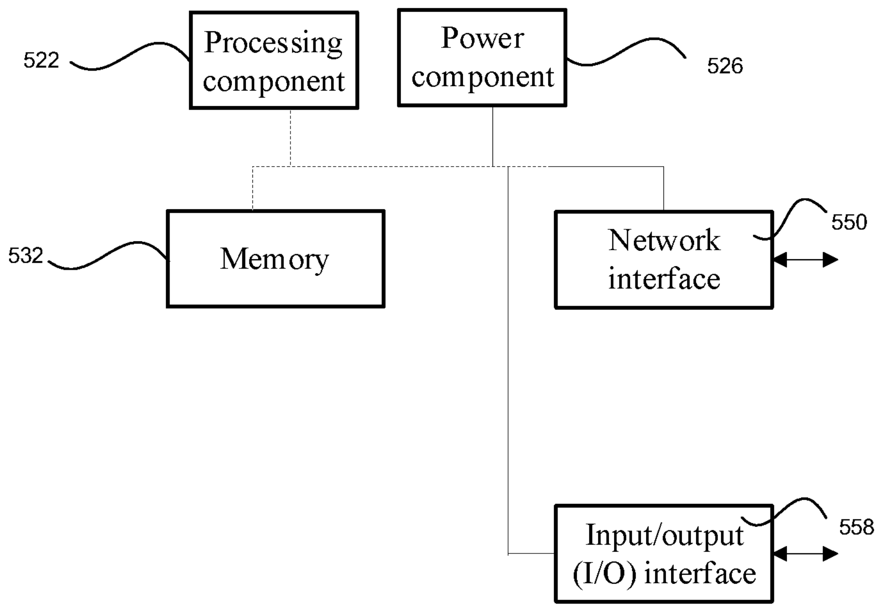
FIG. 5 is a structural diagram showing an apparatus for determining a transmission parameter according to an embodiment of the present disclosure.

FIG. 5 is a block diagram showing an apparatus 500 for determining a transmission parameter according to an embodiment of the present disclosure. For example, the apparatus 500 may be provided as a server. Referring to FIG. 5, the apparatus 500 includes a processing component 522, which further includes one or more processors and a memory resource represented by a memory 532 configured to store instructions executable by the processing component 522, such as an application program. The application program stored in the memory 532 may include one or more modules, each corresponding to a set of instructions. In addition, the processing component 522 is configured to execute the instructions to execute the method for determining the transmission parameter as described above.

The apparatus 500 may further include: a power component 526 configured to perform power management of the apparatus 500, a wired or wireless network interface 550 configured to connect the apparatus 500 to a network, and an input/output (I/O) interface 558. The apparatus 500 may operate an operating system stored in the memory 532, such as Windows Server™, Mac OS X™, Unix™, Linux™, FreeBSD™, or the like.

Figure 6:
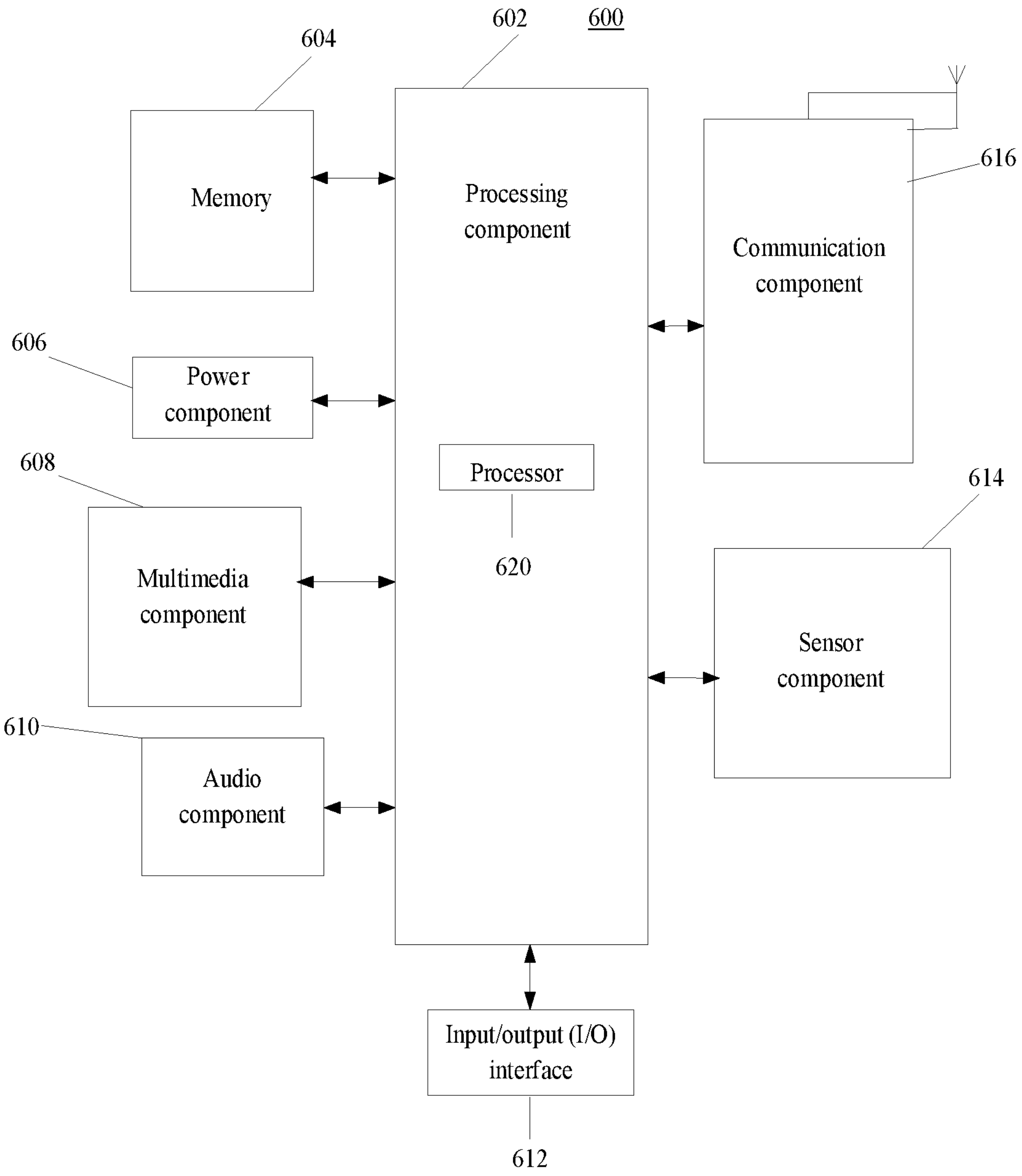
FIG. 6 is a structural diagram showing an apparatus for sending a HARQ-ACK according to an embodiment of the present disclosure.

FIG. 6 is a block diagram showing an apparatus 600 for sending a HARQ-ACK according to an embodiment of the present disclosure. For example, the apparatus 600 may be a mobile phone, a computer, a digital broadcast terminal, a messaging device, a gaming console, a tablet, a medical device, exercise equipment, a personal digital assistant, and the like.

Referring to FIG. 6, the apparatus 600 may include one or more of: a processing component 602, a memory 604, a power component 606, a multimedia component 608, an audio component 610, an input/output (I/O) interface 612, a sensor component 614, and a communication component 616.

The processing component 602 typically controls overall operations of the apparatus 600, such as the operations associated with display, telephone calls, data communications, camera operations, and recording operations. The processing component 602 may include one or more processors 620 to execute instructions to perform all or part of the steps in the method as described above. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the apparatus 600. For instance, the sensor component 614 may detect an open/closed status of the apparatus 600, relative positioning of components, e.g., the display and the keypad, of the apparatus 600, a change in position of the apparatus 600 or a component of the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may further include a light sensor, such as a CMOS or CCD image sensor, for use in imaging applications. In some embodiments, the sensor component 614 may further include an accelerometer sensor, a gyroscope sensor, a magnetic sensor, a pressure sensor, or a temperature sensor.

The communication component 616 is configured to facilitate communication, wired or wirelessly, between the apparatus 600 and other devices. The apparatus 600 can access a wireless network based on a communication standard, such as WiFi, 2G, 3G, or a combination thereof. In one example embodiment, the communication component 616 receives a broadcast signal or broadcast associated information from an external broadcast management system via a broadcast channel. In one example embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method described above.

In embodiments of the present disclosure, there is further provided a non-transitory computer readable storage medium including instructions, such as the memory 604 including instructions, and the instructions are executable by the processor 620 in the apparatus 600 to perform the method described above. For example, the non-transitory computer readable storage medium may be a ROM, a RAM, a CD-ROM, a magnetic tape, a floppy disc, an optical data storage device, and the like.

Embodiments of the present disclosure provide a method for determining a transmission parameter, a method for sending a HARQ-ACK, an apparatus, a device, and a storage medium.

According to a first aspect, there is provided a method for determining a transmission parameter, which is applied to a network-side device, and the method includes:

determining a first set containing at least M consecutive integer elements, wherein an integer element indicates a slot interval between a PDSCH and a channel configured to feed back a HARQ-ACK for the PDSCH.

In an implementation of the present disclosure, M is a maximum number of PDSCHs among a multi-TTI PDSCH that are capable of being scheduled by a single DCI, or M is a number of PDSCHs among the multi-TTI PDSCH that are scheduled by the single DCI.

In an implementation of the present disclosure, the method further includes:

determining that a first interval value is a minimum value among the M consecutive integer elements in a case where the first set contains the M consecutive integer elements.

In an implementation of the present disclosure, the method further includes:

determining that a first interval value is a minimum value among N consecutive integer elements in a case where the first set contains the N consecutive integer elements, where N is greater than M.

In an implementation of the present disclosure, the method further includes:

determining that a first interval value is a value among N−M+1 consecutive integer elements of N consecutive integer elements in a case where the first set contains the N consecutive integer elements, where N is greater than M, wherein the N−M+1 consecutive integer elements contain smallest N−M+1 integer elements among the N consecutive integer elements.

In an implementation of the present disclosure, the integer elements in the first set include:

a preset number of values from 0 to 15; or

−1 and a preset number of values from 0 to 15.

According to a second aspect, there is provided a method for sending a HARQ-ACK, which is applied to a user equipment, and the method includes:

determining a first set containing at least M consecutive integer elements; wherein an integer element indicates a slot interval between a PDSCH and a channel configured to feed back a HARQ-ACK for the PDSCH;

determining a first interval value, wherein the first interval value is a value among the at least M consecutive integer elements in the first set;

determining a slot of a channel configured to send a HARQ-ACK for a multi-TTI PDSCH according to the first interval value and a slot corresponding to a last PDSCH among the multi-TTI PDSCH; and sending the HARQ-ACK for the multi-TTI PDSCH through the channel.

In an implementation of the present disclosure, M is a maximum number of PDSCHs among a multi-TTI PDSCH that are capable of being scheduled by a single DCI, or M is a number of PDSCHs among the multi-TTI PDSCH that are scheduled by the single DCI.

In an implementation of the present disclosure, the determining the first interval value includes:

determining that the first interval value is a minimum value among the M consecutive integer elements in a case where the first set contains the M consecutive integer elements.

In an implementation of the present disclosure, the determining the first interval value includes:

determining that the first interval value is a minimum value among N consecutive integer elements in a case where the first set contains the N consecutive integer elements, where N is greater than M.

In an implementation of the present disclosure, the determining the first interval value includes:

determining that the first interval value is a value among N−M+1 consecutive integer elements of N consecutive integer elements in a case where the first set contains the N consecutive integer elements, where N is greater than M, wherein the N−M+1 consecutive integer elements contain smallest N−M+1 integer elements among the N consecutive integer elements.

In an implementation of the present disclosure, the integer elements in the first set include:

a preset number of values from 0 to 15; or

−1 and a preset number of values from 0 to 15.

According to a third aspect, there is provided an apparatus for determining a transmission parameter, which is applied to a network-side device, and the apparatus includes:

a first determination module, configured to determine a first set containing at least M consecutive integer elements;

wherein an integer element indicates a slot interval between a PDSCH and a channel configured to feed back a HARQ-ACK for the PDSCH.

In an implementation of the present disclosure, M is a maximum number of PDSCHs among a multi-TTI PDSCH that are capable of being scheduled by a single DCI, or M is a number of PDSCHs among the multi-TTI PDSCH that are scheduled by the single DCI.

According to a fourth aspect, there is provided an apparatus for sending a HARQ-ACK, which is applied to a user equipment, and the apparatus includes:

a fifth determination module, configured to determine a first set containing at least M consecutive integer elements; wherein an integer element indicates a slot interval between a PDSCH and a channel configured to feed back a HARQ-ACK for the PDSCH;

a sixth determination module, configured to determine a first interval value, wherein the first interval value is a value among the at least M consecutive integer elements in the first set;

a seventh determination module, configured to determine a slot of a channel configured to send a HARQ-ACK for a multi-TTI PDSCH according to the first interval value and a slot corresponding to a last PDSCH among the multi-TTI PDSCH; and a sending module, configured to send the HARQ-ACK for the multi-TTI PDSCH through the channel.

In an implementation of the present disclosure, M is a maximum number of PDSCHs among a multi-TTI PDSCH that are capable of being scheduled by a single DCI, or M is a number of PDSCHs among the multi-TTI PDSCH that are scheduled by the single DCI.

According to a fifth aspect, there is provided a network-side device, including:

a processor; and a memory configured to store executable instructions of the processor;

wherein the processor is configured to execute the executable instructions in the memory to implement steps of the method for determining the transmission parameter.

According to a sixth aspect, there is provided a user equipment, including:

a processor; and a memory configured to store executable instructions of the processor;

wherein the processor is configured to execute the executable instructions in the memory to implement steps of the method for sending the HARQ-ACK.

According to a seventh aspect, there is provided a non-transitory computer readable storage medium having executable instructions stored thereon which, when executed by a processor, implement steps of the method for determining the transmission parameter or steps of the method for sending the HARQ-ACK.

The technical solutions provided by embodiments of the present disclosure may include beneficial effects: it is determined that the first set contains the at least M consecutive integer elements, and in a case where a value of M is set reasonably, it provides a basic condition for indication of an appropriate first interval value by the DCI. When the DCI indicates the appropriate first interval value, a codebook on the channel that feeds back the HARQ-ACK can perform the HARQ-ACK feedback on all PDSCHs among the scheduled multi-TTI PDSCHs.

Other implementations of embodiments of the present disclosure will be apparent to those skilled in the art from consideration of the specification and practice of the present disclosure disclosed herein. The present disclosure is intended to cover any variations, uses, or adaptations embodiments of the present disclosure, which are in accordance with the general principles of embodiments of the present disclosure and include common general knowledge or conventional technical means in the art that are not disclosed in the present disclosure. The specification and embodiments are illustrative, and the real scope and spirit of embodiments of the present disclosure is defined by the appended claims.

It should be understood that embodiments of the present disclosure are not limited to the precise structures that have been described above and shown in the drawings, and various modifications and changes can be made without departing from the scope thereof. The scope of embodiments of the present disclosure is limited only by the appended claims.

What is claimed is:

1. A method for determining a transmission parameter, comprising:

determining, by a network-side device, a first set comprising a plurality of consecutive integer elements, wherein an integer element indicates a slot interval between a Physical Downlink Shared channel (PDSCH) and a channel configured to feed back a Hybrid Automatic Repeat reQuest Acknowledgement (HARQ-ACK) for the PDSCH, wherein the plurality of consecutive integer elements comprise at least M consecutive integer elements, and M is a maximum number of PDSCHs among a Multi Transmission Time Interval (multi-TTI) PDSCH that are capable of being scheduled by a single Downlink Control Information (DCI), or M is a number of PDSCHs among the multi-TTI PDSCH that are scheduled by the single DCI, and M is an integer greater than 1 and less than or equal to 8, wherein the method further comprises:

determining that a first interval value is a value among N−M+1 consecutive integer elements of N consecutive integer elements in response to determining that the first set comprises the N consecutive integer elements, wherein N is greater than M, and the N−M+1 consecutive integer elements comprise smallest N−M+1 integer elements among the N consecutive integer elements.

2. The method for determining the transmission parameter according to claim 1, further comprising:

determining that the first interval value is a minimum value among the plurality of consecutive integer elements in response to determining that the first set comprises the plurality of consecutive integer elements.

3. The method for determining the transmission parameter according to claim 1, further comprising:

determining that the first interval value is a minimum value among N consecutive integer elements in response to determining that the first set comprises the N consecutive integer elements, wherein N is greater than M.

4. The method for determining the transmission parameter according to claim 1, wherein the plurality of integer elements in the first set comprise:

a preset number of values from 0 to 15; or

−1 and the preset number of the values from 0 to 15.

5. A method for sending a Hybrid Automatic Repeat reQuest Acknowledgement (HARQ-ACK), comprising:

determining, by a user equipment, a first set comprising a plurality of consecutive integer elements, wherein an integer element indicates a slot interval between a Physical Downlink Shared channel (PDSCH) and a channel configured to feed back a HARQ-ACK for the PDSCH;

determining, by the user equipment, a first interval value, wherein the first interval value is a value among the plurality of consecutive integer elements in the first set;

determining, by the user equipment, a slot of a channel configured to send a HARQ-ACK for a Multi Transmission Time Interval (multi-TTI) PDSCH according to the first interval value and a slot corresponding to a last PDSCH among the multi-TTI PDSCH; and sending, by the user equipment, the HARQ-ACK for the multi-TTI PDSCH through the channel, wherein the plurality of consecutive integer elements comprise at least M consecutive integer elements and M is a maximum number of PDSCHs among a multi-TTI PDSCH that are capable of being scheduled by a single Downlink Control Information (DCI), or Mis a number of PDSCHs among the multi-TTI PDSCH that are scheduled by the single DCI, and M is an integer greater than 1 and less than or equal to 8, wherein determining the first interval value comprises:

determining that the first interval value is a value among N−M+1 consecutive integer elements of N consecutive integer elements in response to determining that the first set comprises the N consecutive integer elements, wherein N is greater than M, and the N−M+1 consecutive integer elements comprises smallest N−M+1 integer elements among the N consecutive integer elements.

6. The method for sending the HARQ-ACK according to claim 5, wherein the determining the first interval value comprises:

determining that the first interval value is a minimum value among the plurality of consecutive integer elements in response to determining that the first set comprises the plurality of consecutive integer elements.

7. The method for sending the HARQ-ACK according to claim 5, wherein determining the first interval value comprises:

determining that the first interval value is a minimum value among N consecutive integer elements in response to determining that the first set comprises the N consecutive integer elements, wherein N is greater than M.

8. The method for sending the HARQ-ACK according to claim 5, wherein the plurality of integer elements in the first set comprise:

a preset number of values from 0 to 15; or

−1 and the preset number of the values from 0 to 15.

9. A network-side device, comprising:

a processor; and a memory configured to store executable instructions of the processor;

wherein the processor is configured to execute the executable instructions in the memory to implement steps of the method for determining the transmission parameter according to claim 1.

10. A user equipment, comprising:

a processor; and a memory configured to store executable instructions of the processor;

wherein the processor is configured to execute the executable instructions in the memory to implement acts comprising:

determining a first set comprising a plurality of consecutive integer elements, wherein an integer element indicates a slot interval between a Physical Downlink Shared channel (PDSCH) and a channel configured to feed back a Hybrid Automatic Repeat reQuest Acknowledgement (HARQ-ACK) for the PDSCH;

determining a first interval value, wherein the first interval value is a value among the plurality of consecutive integer elements in the first set;

determining a slot of a channel configured to send a HARQ-ACK for a Multi Transmission Time Interval (multi-TTI) PDSCH according to the first interval value and a slot corresponding to a last PDSCH among the multi-TTI PDSCH; and sending the HARQ-ACK for the multi-TTI PDSCH through the channel, wherein the plurality of consecutive integer elements comprise at least M consecutive integer elements and M is a maximum number of PDSCHs among a multi-TTI PDSCH that are capable of being scheduled by a single Downlink Control Information (DCI), or Mis a number of PDSCHs among the multi-TTI PDSCH that are scheduled by the single DCI, and M is an integer greater than 1 and less than or equal to 8, wherein the processor is further configured to:

determine that the first interval value is a value among N−M+1 consecutive integer elements of N consecutive integer elements in response to determining that the first set comprises the N consecutive integer elements, wherein N is greater than M, and the N−M+1 consecutive integer elements comprises smallest N−M+1 integer elements among the N consecutive integer elements.

11. The user equipment according to claim 10, wherein the processor is further configured to:

determine that the first interval value is a minimum value among the plurality of consecutive integer elements in response to determining that the first set comprises the plurality of consecutive integer elements.

12. The user equipment according to claim 10, wherein the processor is further configured to:

determine that the first interval value is a minimum value among N consecutive integer elements in response to determining that the first set comprises the N consecutive integer elements, wherein N is greater than M.

13. The user equipment according to claim 10, wherein the plurality of integer elements in the first set comprise:

a preset number of values from 0 to 15; or

−1 and the preset number of the values from 0 to 15.

* * * * *